United States Patent
Sakakibara

(10) Patent No.: US 8,745,697 B2
(45) Date of Patent: Jun. 3, 2014

(54) INFORMATION PROCESSING APPARATUS AND INFORMATION PROCESSING METHOD

(75) Inventor: Akiyoshi Sakakibara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1241 days.

(21) Appl. No.: 12/076,390

(22) Filed: Mar. 18, 2008

(65) Prior Publication Data

US 2008/0307510 A1    Dec. 11, 2008

(30) Foreign Application Priority Data

Mar. 19, 2007 (JP) ................................. 2007-071559

(51) Int. Cl.
- G06F 7/04 (2006.01)
- G06F 15/16 (2006.01)
- G06F 17/30 (2006.01)
- H04L 29/06 (2006.01)
- H04N 7/16 (2011.01)

(52) U.S. Cl.
USPC ..................................... 726/4; 726/5; 726/27

(58) Field of Classification Search
None
See application file for complete search history.

(56) References Cited

U.S. PATENT DOCUMENTS

| 6,408,306 B1* | 6/2002 | Byrne et al. ........................... 1/1 |
| 2004/0186679 A1* | 9/2004 | Ohtani ........................... 702/122 |
| 2005/0210293 A1* | 9/2005 | Ohtani ........................... 713/201 |

FOREIGN PATENT DOCUMENTS

| JP | 2005-196337 | 7/2005 |
| JP | 2005-196560 | 7/2005 |
| JP | 2006-074786 | 3/2006 |
| JP | 2006-127504 | 5/2006 |

OTHER PUBLICATIONS

Japanese Office Action dated Mar. 13, 2012.
Takayoshi, Miyaji, "Cosminexus Feature Practical Guide Second Edition," Hitachi, Ltd., pp. 625-670, Oct. 2006. Partial English translation of pp. 645-647.

* cited by examiner

*Primary Examiner* — Kambiz Zand
*Assistant Examiner* — Trong Nguyen
(74) *Attorney, Agent, or Firm* — Harness, Dickey & Pierce, P.L.C.

(57) ABSTRACT

A multifunction product, when receiving input of login name and password, requests an LDAP server to perform authentication by using a pre-set representative ID. If the authentication is successful, the multifunction product requests the LDAP server to search for user information (DN) with the use of the login name, and after acquiring the DN, requests the LDAP server to perform authentication with the use of the DN. If the authentication processing is successful, the multifunction product permits a search for user information stored in the LDAP server.

11 Claims, 8 Drawing Sheets

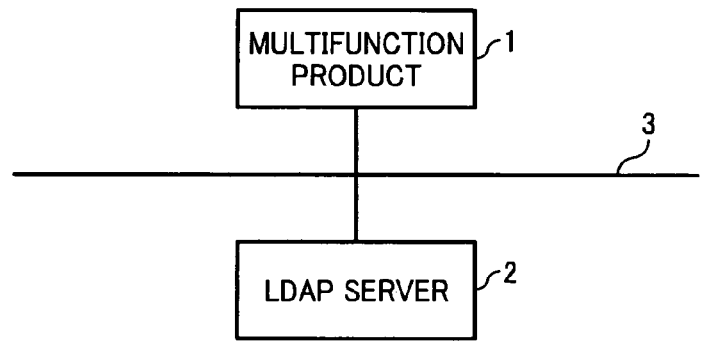
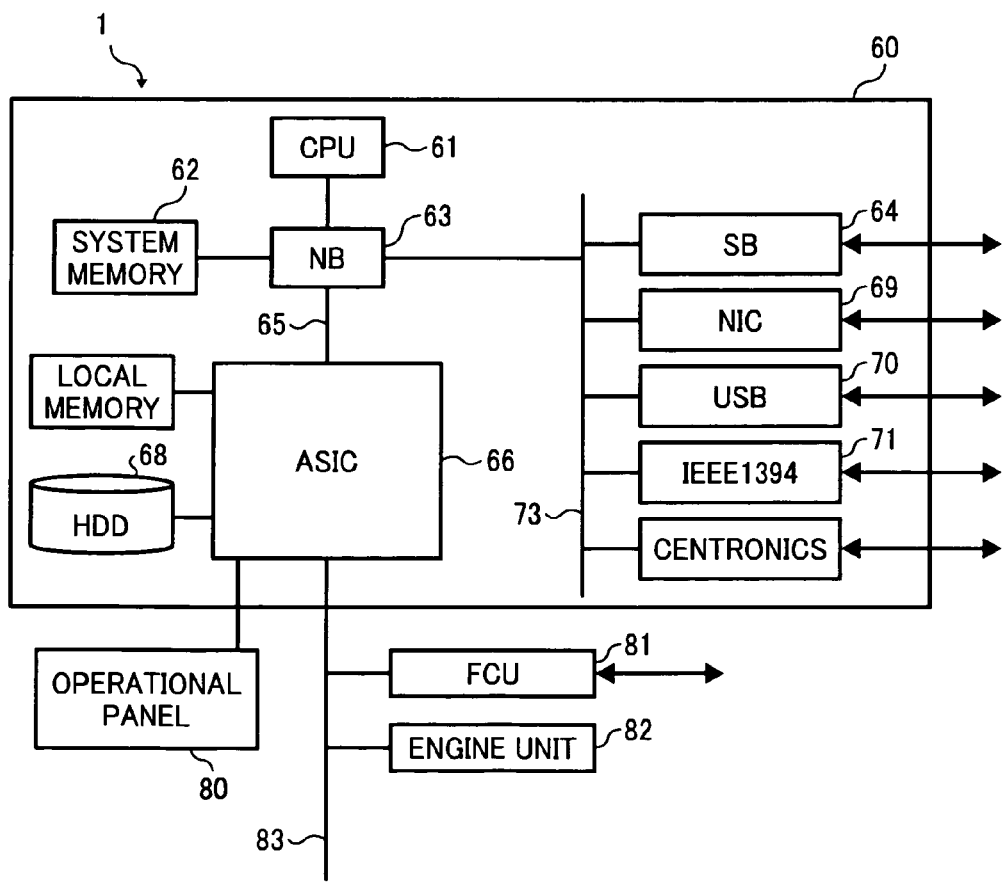

FIG. 3

| REPRESENTATIVE ID SETTING SCREEN |
| --- |
| LDAP SERVER REGISTRATION |
| SERVER [          ] |
| SEARCH START POSITION [          ] |
| REPRESENTATIVE ID [          ] |
| PASSWORD [          ] |

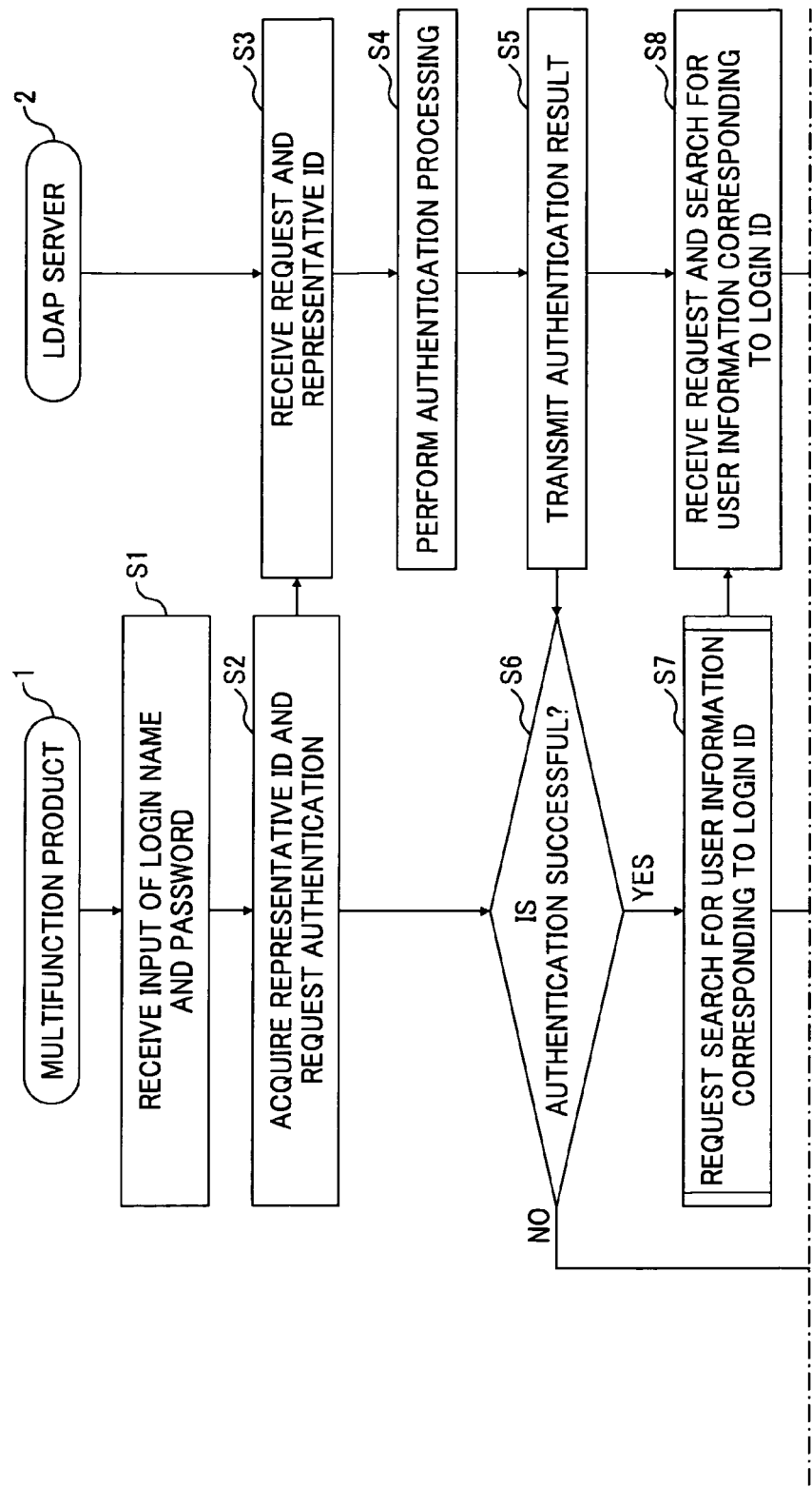

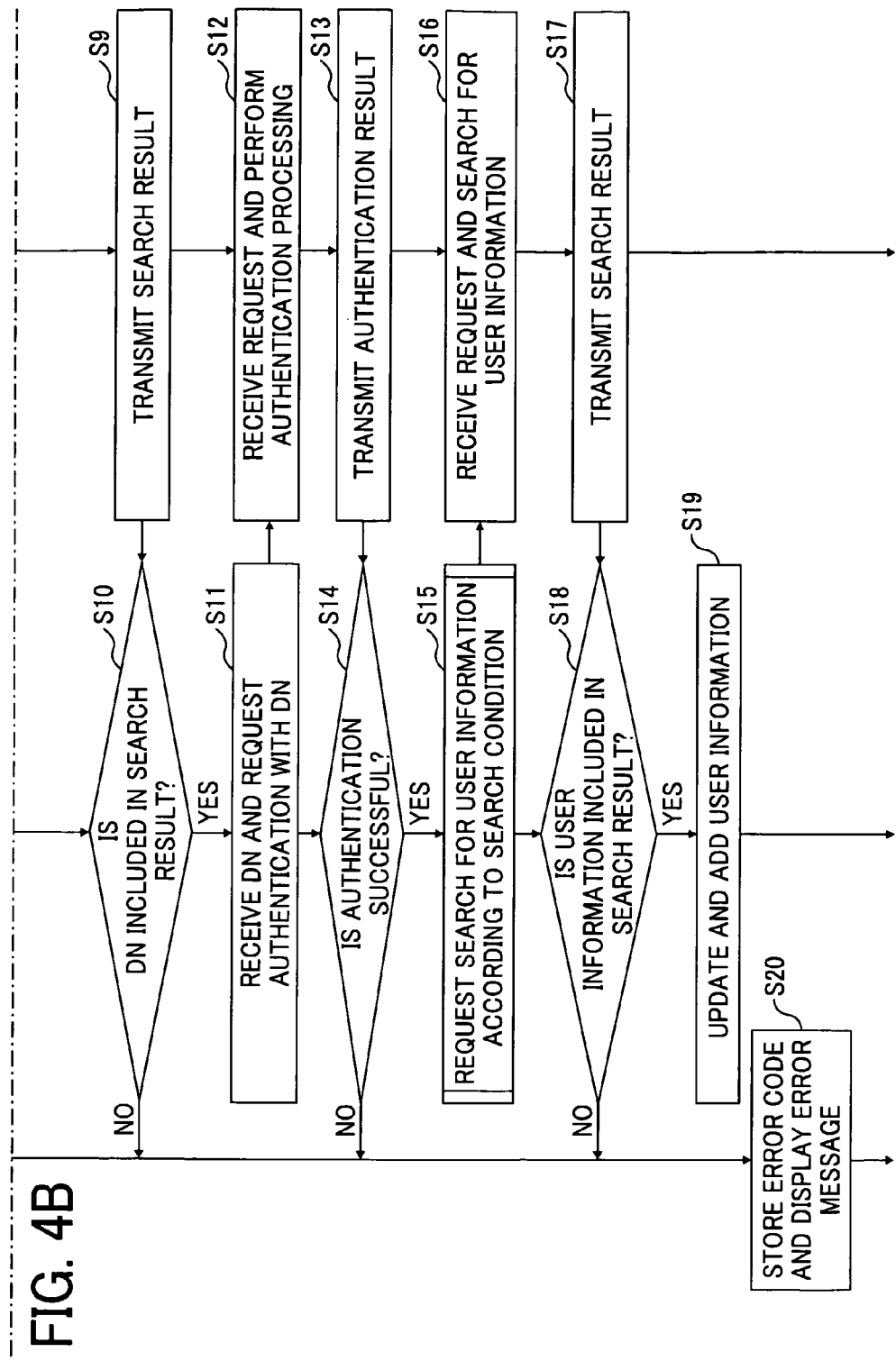

FIG. 5

LOGIN SCREEN

PASSWORD

LOGIN NAME

LOGIN ATTRIBUTE

FIG. 6

LOGIN SCREEN

PASSWORD

LOGIN NAME | name1

LOGIN ATTRIBUTE | cn

FIG. 7

LOGIN SCREEN

PASSWORD [ ]

LOGIN NAME [ name1, name2 ]

LOGIN ATTRIBUTE [ cn, uid ]

FIG. 8

LOGIN SCREEN

PASSWORD [ ]

LOGIN NAME [ name1, name2 ]

LOGIN ATTRIBUTE [ cn = uid ]

FIG. 10

```
              LOGIN SCREEN
  PASSWORD      [                    ]
  LOGIN NAME (cn) [      name1       ]
```

FIG. 11

```
              LOGIN SCREEN
  PASSWORD         [                    ]
  LOGIN NAME (cn|uid) [   name1, name2  ]
```

FIG. 12

```
              LOGIN SCREEN
  PASSWORD         [                    ]
  LOGIN NAME (cn&uid) [   name1, name2  ]
```

INFORMATION PROCESSING APPARATUS AND INFORMATION PROCESSING METHOD

CROSS-REFERENCE TO RELATED APPLICATIONS

The present application claims priority to and incorporates by reference the entire contents of Japanese priority document, 2007-071559 filed in Japan on Mar. 19, 2007.

BACKGROUND OF THE INVENTION

1. Field of the Invention

The present invention relates to an image forming apparatus including an information processing apparatus that acquires user information stored in an external authentication server, a copier, a facsimile apparatus, a scanner, and a printer.

2. Description of the Related Art

Under the conventional technology, for example, Japanese Patent Applications Laid-Open No. 2006-74786, No. 2006-127504, No. 2005-196337, and No. 2005-196560 disclose that a client apparatus acquires user information stored in an external authentication server (hereinafter, "LDAP server") configured to comply with a lightweight directory access protocol (LDAP), and performs various processing by using the user information. Specifically, when the client apparatus receives input of a user ID from a user, the client apparatus sends the user ID to the LDAP server and requests the LDAP server to check if the user is authentic based on the user ID as login information from the user. If the LDAP server determines that the user is authentic, the client apparatus requests the LDAP server to search for user information corresponding to the user ID, and if the LDAP server finds such user information, acquires the user information from the LDAP server. Some client apparatuses also request the LDAP server to search for user information with various attribute information included in user information, and acquire user information from the LDAP server.

On the other hand, the LDAP server sometimes performs user authentication. In this case, attribute information is possibly used as login information for the authentication. LDAP servers have differing specifications and processing environments. Therefore, attribute information that can be handled in one LDAP server may not be handled in other LDAP server. It is difficult to find a specification of login information handleable among all the LDAP servers. On this account, it is recommended to use a distinguished name (DN), which is handleable among a plurality of LDAP servers, as login information. However, a DN generally includes a great numbers of characters and a user may feel troublesome to input a DN as login information into a client apparatus.

SUMMARY OF THE INVENTION

It is an object of the present invention to at least partially solve the problems in the conventional technology.

According to an aspect of the present invention, there is provided an information processing apparatus capable of communicating via a network with a server apparatus storing therein user information that includes at least one piece of hierarchized attribute information. The information processing apparatus includes an input unit that receives input of information from a user; a first requesting unit that requests, when the information received by the input receiving unit is authentication information of at least one piece of the attribute information included in the user information, the server apparatus to perform authentication by using a pre-set representative authentication information corresponding to the authentication information; a first acquiring unit that acquires an authentication result indicative of the authentication performed by the server apparatus; and a permitting unit that permits a search for the user information when the authentication result is indicative of success of the authentication.

According to another aspect of the present invention, there is provided an information processing method realized on an information processing apparatus capable of communicating via a network with a server apparatus storing therein user information that includes at least one piece of hierarchized attribute information. The information processing method includes receiving input of information from a user; requesting, when the information received at the receiving is authentication information of at least one piece of the attribute information included in the user information, the server apparatus to perform authentication by using a pre-set representative authentication information corresponding to the authentication information; acquiring an authentication result indicative of the authentication performed by the server apparatus; and permitting a search for the user information when the authentication result is indicative of success of the authentication.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of an information processing system according to one embodiment of the present invention;

FIG. 2 is a block diagram of a hardware configuration of a multifunction product shown in FIG. 1;

FIG. 3 is an example of a representative ID setting screen;

FIG. 4 is a flowchart of an authentication processing for authenticating a user performed by the information processing system shown in FIG. 1;

FIG. 5 is an example of a login screen;

FIGS. 6 to 8 are examples of input of information in the login screen;

FIGS. 10 to 12 are other examples of login screens and input of information in the login screen.

DETAILED DESCRIPTION OF THE PREFERRED EMBODIMENTS

Figure 9:
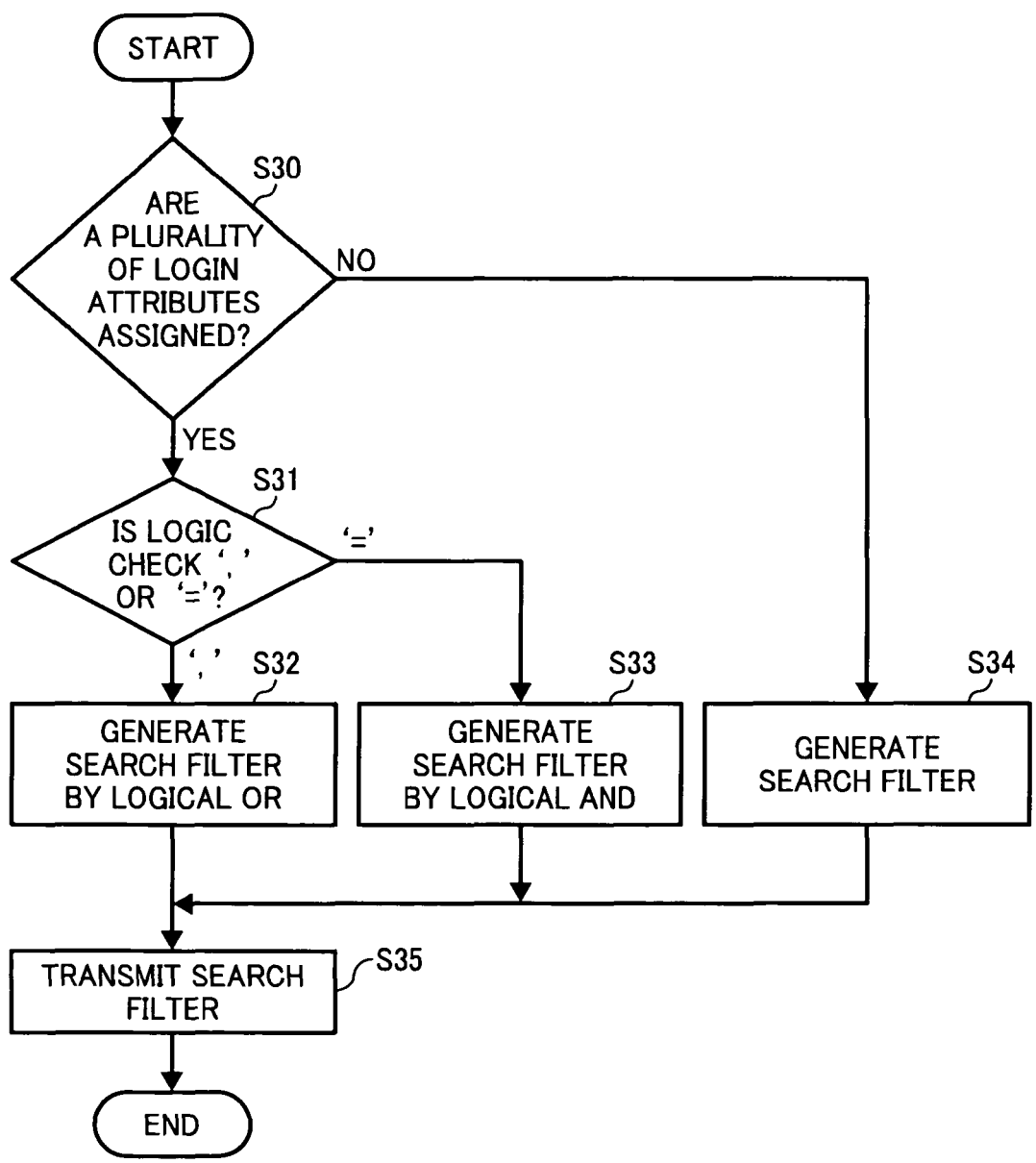
FIG. 9 is a flowchart of a search filter generation process performed by the information processing system shown in FIG. 1.

Exemplary embodiments of an information processing apparatus and an information processing method according to the present invention are described in detail below. In the embodiments explained below, an image processing apparatus is described as an example of an information processing apparatus. The image processing apparatus described below has functions of various apparatuses, such as a printer, a copier, a facsimile apparatus, and a scanner, provided within a single housing. In other words, the image processing apparatus described below is a so called multifunction product.

FIG. 1 is a block diagram of an information processing system according to an embodiment of the present invention. The information processing system includes a multifunction product 1 and an LDAP server 2 that are connected to each other through a network 3. The network 3 is, for example, a local area network (LAN), an Intranet, an Ethernet (registered trademark), or the Internet. The LDAP server 2 complies with the LDAP, and stores therein user information to be explained later.

FIG. 2 is a block diagram of a hardware configuration of the multifunction product 1. The multifunction product 1 includes a controller 60, an operation panel 80, a fax control unit (FCU) 81, and an engine unit 82. FCU 81 and the engine unit 82 are connected to ASIC 66 of the controller 60 via PCI bus 83. The local memory, HDD 68, etc. are connected to ASIC 66, and CPU 61 and ASIC 66 are connected to the controller 60 via NB 63 of a CPU chip set. ASIC 66 and NB 63 are connected via AGP (Accelerated Graphics Port) 65. NB (north bridge) 63 is a bridge for connecting CPU 61, the system memory 62, SB (south bridge) 64, ASIC 66, MC 69, USB 70, IEEE1394 71, and Centronics. NB 63 is connected with SB 64, NIC 69, USB 70, IEEE1394 71, and Centronics via PCI bus 73. SB(south bridge) 64 is a bridge for connecting ROM, a peripheral device, etc. with PCI bus 73. Functions realized by carrying out a computer program stored in a system memory 62 and a hard disk drive (HDD) 68 by a central processing unit (CPU) 61 in the controller 60, are described in detail in Japanese Patent Application Laid-Open No. 2005-196560.

The CPU 61 stores therein a representative ID used for authentication processing performed in the LDAP server 2. The representative ID is generally supplied by the user in advance. Subsequently, when a user inputs a login name and a password, the CPU 61 first requests the LDAP server 2 to check-if the user is authentic based on the representative ID. If the LDAP server 2 determines that the user is authentic, the CPU 61 requests the LDAP server 2 to search for a DN of user information by using the login name input by the user. When the LDAP server 2 retrieves the DN of user information, the CPU 61 requests the LDAP server 2 to authenticate the retrieved DN. If the LDAP server 2 determines that the retrieved DN is authentic, the CPU 61 permits the user to search for user information stored in the LDAP server 2. In other words, the CPU 61 causes the operation panel 80 to display a search screen, and receives input of a search request from the user. When the user inputs a search request in the search screen, the CPU 61 requests the LDAP server 2 to search for user information based on the input search request. The HDD 68 stores therein a representative ID. In addition, the HDD 68 has a user information storage area to store user information acquired from the LDAP server 2.

Although not shown, the LDAP server 2 includes a CPU, a read only memory (ROM), a random access memory (RAM), an external storage apparatus, a communication interface (I/F), and a bus that connects them. In other words, the LDAP server 2 has a hardware configuration an ordinary computer. The ROM stores therein various computer programs such as an operating system with which the CPU controls all parts of the LDAP server 2, and application programs. The external storage apparatus stores therein various computer programs executed by the LDAP server 2 and various data used when executing those computer programs. The external storage apparatus also stores therein user information based upon the LDAP standards. Specifically, user information is in the form of a hierarchical structure, in other words, pieces of attribute information are tiered in the user information. The attribute information can be a 'DN' stated above, some having an attribute value corresponding to an attribute, for example, 'c' (a country), 'o' (organization or company), 'ou' (sub-organization such as a department or a section), 'cn' (common name), 'uid' (a user ID), and other kinds of information such as a FAX number or an e-mail address as an attribute value. User information is also uniquely distinguishable by a DN.

The following describes a procedure of authentication processing performed in the information processing system shown in FIG. 1. First, a procedure of a registration processing to register a representative ID is described.

When a request to set a representative ID is input through the operation panel 80 by a user, the CPU 61 of the multifunction product 1 causes the operation panel 80 to display a representative ID setting screen. FIG. 3 is an example of the representative ID setting screen. In the screen shown in FIG. 3, when assignment information assigning an LDAP server to be a search object, a search start position, a representative ID, and a representative password are input through the operation panel 80 by a user, the CPU 61 receives the input, and stores therein the input information in the HDD 68. Assignment information is, for example, an IP address of the LDAP server 2. A representative ID that can be input is, for example, one piece of the hierarchized attribute information in user information stored in the LDAP server 2. A search start position represents a hierarchical position determined by information set in the multifunction product 1 and a class in which user information of an object user exists. A representative password can be a null value. In this way, a representative ID is set in the multifunction product 1.

A procedure of authentication processing for authenticating a user is described next. FIG. 4 is a flowchart of an authentication processing for authenticating a user performed by the information processing system shown in FIG. 1. FIG. 5 is an example of a login screen displayed on the operation panel 80. In the login screen shown in FIG. 5, when a login name, a password, and a search condition to assign a login attribute are input by the user, the CPU 61 in the multifunction product 1 receives the input (step S1). In some cases, only one login attribute is assigned, and in other cases a plurality of login attributes are assigned. An attribute assignable as a login attribute includes 'cn' and 'uid' out of the attributes mentioned above. A representative password can be a null value.

FIG. 6 is an example of input of information in the login screen. Only one login attribute is assigned in the example shown in FIG. 1. In this case, only one login attribute 'cn' is assigned for a login name 'name1'. It is possible to assign a plurality of login attributes. When a plurality of login attributes is assigned, there are two assignment ways according to a search method. The search method has two ways: by a logical OR and by a logical AND. FIG. 7 is a diagram of an input example to assign a logical OR as a search method when a plurality of login attributes are assigned. FIG. 8 is a diagram of an input example to assign a logical AND as a search method when a plurality of login attributes are assigned. In FIG. 7, when 'name1' and 'name2' are assigned as login names, 'cn' and 'uid' are assigned as login attributes, these assignment methods are 'cn, uid', and a plurality of login attributes are assigned via ',', a search method by a logical OR is shown to be assigned. In other words, it is shown that a search method searching for user information that includes a login name 'name1' matching with an attribute 'cn', and a login name 'name2' matching with a login attribute 'uid' is assigned. In FIG. 8, when 'name1' and 'name2' are assigned as login names, 'cn' and 'uid' are assigned as login attributes, these assignment methods are 'cn=uid', and a plurality of login attributes are assigned via '=', a search method by a logical AND is shown to be assigned. In other words, it is shown that a search method searching for user information that includes a login name 'name1' matching with an attribute 'cn', or a login name 'name2' matching with a login attribute 'uid' is assigned.

Subsequently, the CPU 61 reads from the HDD 68 a representative password and a search start position corresponding to the representative ID input in the representative ID setting screen, transmits these to the LDAP server 2, and requests authentication (step S2). When the LDAP server 2 receives the representative ID, the representative password, and the search start position (step S3), it performs authentication processing of the representative ID (step S4). Specifically, for example, the LDAP server 2 judges whether user information having the representative ID as attribute information within a hierarchical range specified by the search start position is stored in its HDD. If the result of the judgment is affirmative, the LDAP server 2 judges that the authentication is successful and transmits the authentication result to the multifunction product 1 (step S5). If the result of the judgment is negative, the CPU 61 transmits the authentication failure result including the failure reason to the multifunction product 1. When the CPU 61 receives the authentication result, it judges whether the authentication result is indicative of success (step S6). If the result of the judgment is affirmative, the CPU 61 subsequently generates a search filter (a search condition) to request a search for the user information using the login name and the attribute input at step S1.

How the CPU 61 generates a search filter is explained below. FIG. 9 is a flowchart of a search filter generation process performed by the CPU 61. The CPU 61 judges whether the number of login attribute input at step S1 is single or multiple (step S30). An example having a plurality of login attributes is are the ones that are shown in FIGS. 7 and 8. If the result of the judgment is affirmative, a logic check is performed next (step S31). A logic check is a process to judge whether an assigned search method is by a logical OR or by a logical AND as explained above. The CPU 61 generates a search filter according to the result of the logical check. For example, if the CPU 61 judges the assigned search method is by a logical OR, in the example of FIG. 7, it generates a search filter as '|(cn=name1)(uid=name2)' (step S32). The CPU 61 generates a search filter as '&(cn=name1)(uid=name2)', in the example of FIG. 8, if it judges the assigned search method is by a logical AND (step S33). The CPU 61 generates a search filter as 'cn=name1', in the example of FIG. 6, if the judged result at step S30 is negative (step S34).

Then, the CPU 61 transmits the generated search filter to the LDAP server 2 (step S35). Referring back to FIG. 4, when the LDAP server 2 receives the search filter, according to the search filter, it searches user information stored in the HDD (step S8). If the search filter that the LDAP server 2 receives is the one generated in the step S33, the LDAP server 2 searches for user information that is in agreement with a login attribute 'cn' matching with a login name 'name1' or a login attribute that is in agreement with an attribute 'uid' matching with a login name 'name2'. If the search filter that the LDAP server 2 receives is the search filter generated in the step S34, the LDAP server 2 searches for user information that is in agreement with a login attribute 'cn' matching with a login name 'name1'. As a result of the search, if the LDAP server 2 can uniquely specify the user information, it judges the search is successful, and transmits the search result including the DN of the user information to the multifunction product 1 (step S9). If the LDAP server 2 cannot uniquely specify user information, in other words, it cannot specify a DN, that is, if the DN does not exist or a plurality of DNs exist, the LDAP server 2 judges that the search fails, and transmits the search result including the failure reason to the multifunction product 1.

On the other hand, the CPU 61 in the multifunction product 1 receives the search result, and judges whether the search result includes the DN of the user information (step S10), and if the judged result is affirmative, then requests the LDAP server 2 to authenticate the DN included in the search result (step S11). When the LDAP server 2 receives the request, it performs authentication processing to the DN (step S12), and transmits the authentication result to the multifunction product 1 (step S13). If the CPU 61 judges that the authentication succeeds, it transmits the authentication result to the multifunction product 1, on the contrary, if the CPU 61 judges that the authentication has failed, it transmits the authentication result including the failure reason to the multifunction product 1.

When the CPU 61 receives the authentication result, it judges whether the authentication result indicates success (step S14), and permits a search for user information stored in the LDAP server 2 if the result of the judgment is affirmative. The CPU 61 then causes the operation panel 80 to display a search input screen where a search condition is input to search for user information. When a search condition is input, the CPU 61 receives the input, generates a search filter requesting a search for user information according to the search condition, and transmits this to the LDAP server 2 (step S15). For example, a search for a FAX number or an e-mail address in user information can be requested. When the LDAP server 2 receives the search filter, searches for the user information in the HDD (step S16), and transmits the search result including the user information to the multifunction product 1 if the corresponding user information is found in the HDD (step S17). When the CPU 61 receives the search result including user information (step S18), it updates or registers the user information by storing it in the user information storage area of the HDD 68 (step S19).

If an authentication result at step S6 indicates a failure, the CPU 61 stores an error code 1 in the system memory 62, and causes the operation panel 80 to display an error message, including a failure reason included in the authentication result and corresponding to the error code 1 (step S20). For example, the CPU 61 makes an error message such as 'L-001 (123456789)' to be displayed. 'L' stands for an authentication classification, and '001', an error code, and '123456789', error contents from the LDAP server 2. If a search result at step S10 is a failure, similarly, the CPU 61 in the multifunction product 1 stores an error code 2 in the system memory 62, and causes the operation panel 80 to display an error message corresponding to the error code 2. If an authentication result at step S16 is a failure, similarly, the CPU 61 stores an error code 3 in the system memory 62, and causes the operation panel 80 to display an error message, including a failure reason included in the authentication result and corresponding to the error code 3. If an authentication result at step S20 is a failure, similarly, the CPU 61 stores an error code 4 in the system memory 62, and causes the operation panel 80 to display an error message, including a failure reason included in the authentication result and corresponding to the error code 4.

As described above, in the present embodiment, a representative ID is authenticated, after the authentication, a user information-owned DN is acquired, and the DN is again authenticated. In this configuration, a user does not have to input information with a lot of input characters such as a DN as a login name, and inputting a simple login name makes it possible to perform authentication so that security is being maintained and user-friendliness improved. In addition, because any attribute information can be used for authentication as long as the attribute information can be handled by the LDAP server 2, a failure generated from user's use environment or a difference in an LADP server can be reduced.

In a configuration in which a plurality of login attributes can be assigned, various searches such as searches by a logical OR or a logical AND can be performed and can identify the user information easily.

When an authentication or a search fails, displaying an error message according to the failure on the operation panel 80 enables a user to deal with the failure situation quickly and user-friendliness to be improved.

The present invention is not limited to the above embodiment. In other words, various kinds of modifications illustrated below are possible.

For example, login screens shown in FIGS. 10 to 12 can be used as a login screen for inputting a login name and a password. FIG. 10 depicts a screen example when a login attribute is one. On the right of a login name column is shown (cn), and that means a login attribute 'cn' is preset. FIG. 11 depicts a screen example to assign a search method by a logical OR when login attributes are two. On the right of a login name column is shown (cn&uid), and it shows that an attribute 'cn' and an attribute 'uid' are preset in the search method by a logical OR when a login name is assigned. FIG. 12 depicts a screen example to assign a search method by a logical AND when there are two login attributes. On the right of a login name column is shown (cn|uid), and this shows that an attribute 'cn' and an attribute 'uid' are preset in the search method by a logical AND when a login name is assigned. The CPU 61 can properly make such a login screen to be displayed according to manipulated input in the operation panel 80, and according to input information in the login screen, at step S7, a search filter may be generated in the similar manner to the above-mentioned.

A display screen after input is done as shown in FIG. 6 may be displayed on the operation panel 80 to be an illustrated screen in FIG. 10. Similarly, after input is done as shown in FIG. 7, an illustrated screen in FIG. 11 may be displayed on the operation panel 80. A display screen after input is done as shown in FIG. 8 is shifted and an illustrated screen in FIG. 12 may be displayed on the operation panel 80.

'cn' and 'uid' have been used above as assignable attributes as a login attribute; however, login attributes are not limited to these two. In other words, attributes other than 'cn' and 'uid' can be used as assignable attribute as a login attribute. Moreover, the number of an assignable attribute can be equal to or more than two.

Moreover, although an error message is displayed at step S20, a configuration is possible in which it is possible to select whether to display or not display the error message.

Moreover, the information processing apparatus is not limited to the multifunction product 1. In other words, the present technique can be applied to other information processing apparatuses, such as personal computers or a portable apparatuses.

According to one aspect of the present invention, when a user inputs authentication information, a server apparatus performs authentication processing with the use of preset representative authentication information, and enables the search of user information. As a result, the user can handle simple information as authentication information while security is being maintained and user-friendliness improved.

According to another aspect of the present invention, the server apparatus can easily search user information because a search condition generated by inputting assigned authentication information and attribute is transmitted to the server apparatus.

According to still another aspect of the present invention, a plurality of attributes can be assigned, therefore various search conditions are generated and the corresponding user information can be easily specified.

According to still another aspect of the present invention, when authentication fails, a failure message including the failure reason is displayed so that a user can quickly deal with the failure situation and user-friendliness can be improved. In this case, a disapproval of user information search can also prevent a non-expected user from using user information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus configured to communicate via a network with a server apparatus storing therein user information that includes at least one piece of hierarchized attribute information, the information processing apparatus comprising:
   an input receiving unit that receives input of information from a user;
   a first requesting unit that requests, when the information received by the input receiving unit is authentication information of at least one piece of the attribute information included in the user information, the server apparatus to perform authentication by using a pre-set representative authentication information corresponding to the authentication information;
   a first acquiring unit that acquires an authentication result indicative of the authentication performed by the server apparatus; and
   a permitting unit that permits a search for the user information when the authentication result is indicative of success of the authentication, the permitting unit including,
      a second requesting unit that generates, when the authentication result is indicative of success of the authentication, a search condition using the authentication information and login attribute information received by the input receiving unit, and requests an identification name matching the search condition from the server apparatus; and
      a third requesting unit that requests the server apparatus to perform authentication by using the identification name.

2. The information processing apparatus according to claim 1, further comprising a representative authentication information setting unit that, when the information received by the input receiving unit is representative authentication information, stores the representative authentication information in a storage unit,
   wherein the first requesting unit sends, when the information received by the input receiving unit is authentication information, representative authentication information corresponding to the authentication information stored in the storage unit to the server apparatus, and requests the server apparatus to perform authentication by using the representative authentication information.

3. The information processing apparatus according to claim 1, wherein
   the user information includes an identification name to uniquely specify the user information as the attribute information, the input receiving unit receives input to assign to an attribute a value shown by the login attribute information and further receives input of authentication information, and the permitting unit further includes
- a second acquiring unit that acquires an identification name from the server apparatus in response to the request from the second requesting unit;
- a third acquiring unit that acquires an authentication result of the authentication performed by the server apparatus in response to the request from the third requesting unit; and
- a permission judging unit that permits a search for the user information when the authentication result acquired by the third acquiring unit is indicative of success of the authentication.

4. The information processing apparatus according to claim 3, wherein the permission judging unit does not permit a search for the user information when the authentication result acquired by the third acquiring unit fails to uniquely specify the identification name.

5. The information processing apparatus according to claim 3, wherein the input receiving unit receives input of a plurality of attributes.

6. The information processing apparatus according to claim 5, wherein the second requesting unit, when the input receiving unit receives input of the authentication information and the plurality of attributes, generates a search condition indicative of a search method by any one of a logical OR and a logical AND by using the authentication information and the plurality of attributes, and requests the server apparatus to return an identification name matching the search condition.

7. The information processing apparatus according to claim 6, wherein the second requesting unit judges, based on a difference in an input method to assign the plurality of attributes, whether to generate a search condition indicative of a search method by any one of the logical OR and the logical AND, and requests the server apparatus to return an identification name matching the search condition.

8. The information processing apparatus according to claim 3, further comprising a display controlling unit that causes a displaying unit to display an authentication screen on which a user makes an input to assign the authentication information and the attribute, wherein the display controlling unit causes the displaying unit to display an authentication screen with the attribute that can be assigned for the authentication information.

9. The information processing apparatus according to claim 3, wherein an authentication result received by at least one of the first acquiring unit and the third acquiring unit includes a failure reason indicative of a reason why the authentication failed, and the information processing apparatus further comprising a display controlling unit that causes, when an authentication result received by at least one of the first acquiring unit and the third acquiring unit is indicative of a failure, a displaying unit to display a failure message including the failure reason.

10. The information processing apparatus according to claim 1, wherein the server apparatus is a server configured to comply with a lightweight directory access protocol (LDAP) server, and the user information is an entry in the LDAP server.

11. An information processing method realized on an information processing apparatus configured to communicating via a network with a server apparatus storing therein user information that includes at least one piece of hierarchized attribute information, the information processing method comprising:

receiving input of information from a user;

requesting, when the information received is authentication information of at least one piece of the attribute information included in the user information, the server apparatus to perform authentication by using a pre-set representative authentication information corresponding to the authentication information;

acquiring an authentication result indicative of the authentication performed by the server apparatus; and permitting a search for the user information when the authentication result is indicative of success of the authentication, the permitting further including:
- generating, when the authentication result is indicative of success of the authentication, a search condition using the authentication information and login attribute information;
- requesting an identification name matching the search condition from the server apparatus; and
- requesting the server apparatus to perform authentication by using the identification name.

\* \* \* \* \*